Feb. 24, 1942. J. L. DONALY Re. 22,032
FISH BAIT
Original Filed May 28, 1926
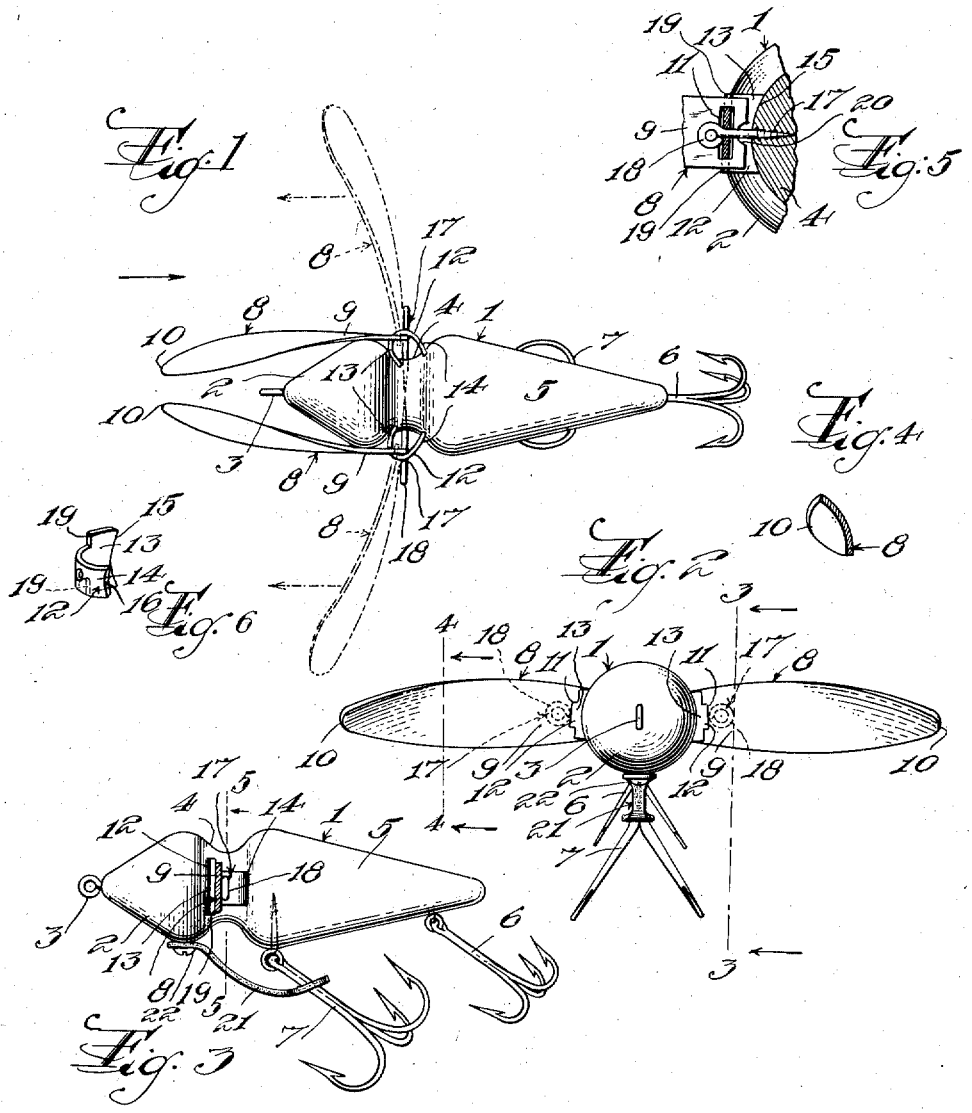
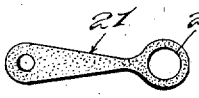
Fig. 7
INVENTOR:
James L. Donaly,
BY
Everett & Rock, ATTORNEYS.

Reissued Feb. 24, 1942

Re. 22,032

UNITED STATES PATENT OFFICE 22,032

FISH BAIT

James L. Donaly, deceased, late of Newark, N. J., by Louise M. Donaly and Helen M. Donaly, Bloomfield, N. J., assignees Original No. 1,677,176, dated July 17, 1928, Serial No. 112,223, May 28, 1926. Application for reissue November 8, 1941, Serial No. 418,424

15 Claims. (Cl. 43—48)

The objects of this invention are to provide an elongated fish bait body carrying hooks with a pair of lateral wings which resist swinging backward further than approximately right angular position to the body, as the bait is drawn forward floating upon the water, and which wings produce a rocking of the bait from side to side and dip alternately into the water to direct the bait from side to side in a zigzag course; to thus closely simulate the appearance of a small creature, such as a large insect or the like, struggling in the water to make its way along the surface in a disabled condition; to produce enough noise and motion in the water to attract the attention of a fish; to secure a simple construction which shall accomplish the foregoing objects, and to obtain other advantages and results as may be brought out by the following description.

Referring to the accompanying drawing, in which like characters of reference indicate the same parts throughout the several views:

Figure 1 is a plan view of a bait embodying the invention, showing in full lines the position which the wings assume in casting through the air and in dot and dash lines the positions which the wings assume when the bait is in the water;

Figure 2 is a front view of the bait with the wings outspread;

Figure 3 is a side view showing one of the wings in section near its base, as on line 3—3, Fig. 2;

Figure 4 is a transverse section of the opposite wing near its tip, as on line 4—4, Fig. 2;

Figure 5 is a detail section on line 5—5, Fig. 3, looking in the direction indicated by the arrow;

Figure 6 is a detail perspective view of one of the hinging strips for the wings, and Figure 7 illustrates a certain resilient holder for keeping the hooks away from the wings.

In the specific embodiment of the invention shown in said drawing, 1 indicates the buoyant body portion of the bait which is shown with a head 2 tapering forwardly to receive a ring 3 for the line and a reduced neck 4, the rest of said body preferably tapering rearwardly, as at 5. In cross-section, said body is preferably circular at all points of its length so as to roll in the water about its longitudinal axis, and the neck 4 is abruptly tapered both forwardly and rearwardly into the larger portions of the body. There is shown two triple hooks secured to the underside of said body, one 6 near the tail thereof and the other 7 just back of the neck 4, but more or less hooks could be employed, as desired, and they could be arranged otherwise than shown.

At opposite sides of the neck 4 and near the forward end of the body of the improved bait are disposed wings 8, 8, non-rotatable with respect to the body but adapted to swing in a substantially horizontal plane as the bait occupies its normal position in the water from a forwardly extending folded together position, as shown in full in Figure 1, to a laterally extending position, as shown in dot and dash lines in Figure 1. These wings are made of any suitable material, such as light sheet metal, and at their bases have each a vertical substantially flat portion 9 from which the wing widens outwardly to about the middle of its length and then tapers to a rounded point 10, being transversely dished or concavo-convex with the hollowed or dished side forward and the outer part of the wing twisted to throw its upper edge forward of the lower edge increasingly from the substantially flat base outward to the tip of the wing.

The hinging of each wing is accomplished by forming at its base a transverse slot 11 which loosely receives a strip 12 as of sheet metal bent into loop form so that its opposite ends engage one 13 the shoulder at the front of the neck, and the other 14 the shoulder at the back of the neck, said ends having concave edges 15 and 16 respectively to fit against the rounded body 1. A suitable securing member, such as a screw eye 17, passes through an aperture in the bend of each hinging strip 12 perpendicularly into the bait body 1, thus securing the strip firmly against said body, and preferably the eye 18 of said screw 17 extends in a plane transverse to the bait body so that it is parallel to the base portion 9 of the wing and serves as a rearward stop therefor. Forward stop means are provided by making the front end portion 13 of the strip 12 of increased width so that there are upper and lower shoulders 19, 19 to be engaged by the base portion of the wing as it swings forward. Preferably the slot 11 in the base portion of the wing receives its hinging strip 12 somewhat loosely so as to permit a natural free movement of the wing, and the base and edge of the wing is shown notched as at 20 to clear the shank of the screw eye 18.

The wings 8 are symmetrically shaped transversely, and when open are disposed in forwardly divergent relation to the body in balanced relation and have laterally extending portions along a major axis which is transverse of the longitudinal axis of the body near the forward end thereof and which will be approximately parallel to the surface of the water on which the bait is moved, the forward concave face of each wing at its ends extending downwardly and rearwardly at an angle oblique to said longitudinal axis, so that the extremities or tips of the wings will dip more deeply into the water than the inner portions thereof and the bait will move upwardly out of the water when the bait is drawn forward.

The operation of the improved bait in use is that in casting, when the bait is passing through the air in the direction of the full-line arrow in Figure 1, the wings 8, 8 fold together as shown in full lines in said figure and offer practically no resistance to the air. When the bait alights upon the water, however, the weight of the hooks brings it into proper position thereon with the wings dipping into the water, and if they have not been opened up by the retardation of the bait in alighting, a slight jerk on the line attached to the ring 3, in the direction shown by the dot and dash arrows in Figure 1, will immediately open the wings as also shown in dot and dash lines in said figure. Said wings then dip in the water, somewhat deeper at their extremities, though said wings are not submerged, and when the line is pulled or jerked they tend to rise upward out of the water because of the forwardly upper inclination transversely of their outer parts. However, in practice the bait is in such an unstable position and it is so impossible for the resistance of the two wings to be exactly equal, that one wing will prevail and rise upward more than the other, causing the bait to rock. As the rising wing passes more out of the water, however, its resistance becomes less than that of the other wing, whereupon the bait rocks in the other direction, and this action continuing the bait rocks from side to side and the wings alternately rise out of the water, or nearly out of it, and dip again into the water. This gives somewhat the effect of swimming the overhand stroke as the line is pulled and the bait progresses along the surface of the water in a zigzagging course with considerable motion and consequent noise in the water. In fact, as each of the wings descends from its elevated position it strikes or slaps the water forcibly, and makes sounds which succeed one another in a very life like manner. All this serves admirably to attract the attention of a fish and to simulate the appearance of a small creature struggling in the water at a disadvantage or as if disabled, and it has been found to be a most attractive lure.

In order to guard against the forward hook 7 swinging so as to obstruct the movements of the wings 8, 8 there is shown a resilient guard 21, illustrated as made of a strip of sheet rubber, which is disposed longitudinally of the bait at its lower part and secured at one end to the head 2 as by a screw 22, while its other end provides an opening 23 through which the shank of the triple hook 7 passes loosely. This sufficiently resists any falling of the hook 7 forwardly into the path of the wings and at the same time does not interfere with the freedom of the hook for other purposes.

Various detail modifications may be made by those skilled in the art in carrying out the invention, without departing from the spirit and scope thereof, and therefore there is no desire to be understood as limiting the invention except as required by the following claims when construed in the light of the prior art.

Having thus described the invention, what is claimed is:

1. A fish bait having a body, lateral wings at opposite sides of said body non-rotatable with respect thereto and adapted to swing between a laterally projecting position and a forwardly folded position, said wings being transversely shaped so as to tend to move vertically in the water when the bait is drawn forward, means for attaching a line to the front of the body, and means for attaching hooks to said body.

2. A fish bait having an elongated body adapted to roll from side to side, lateral wings at opposite sides of said body non-rotatable with respect thereto and adapted to swing between a laterally projecting position and a forwardly folded position, said wings being transversely shaped so as to move vertically in the water when the bait is drawn forward, means for attaching a line to the front of the body, and means for attaching hooks to said body.

3. A fish bait having an elongated body transversely rounded so as to roll in the water, lateral wings at opposite sides of said body non-rotatable with respect thereto and adapted to swing between a laterally projecting position and a forwardly folded position, said wings being transversely shaped so as to move vertically in the water when the bait is drawn forward, means for attaching a line to the front of the body, and means for attaching hooks to said body.

4. A fish bait having an elongated body circular in cross-section, lateral wings at opposite sides of said body non-rotatable with respect thereto and adapted to swing between a laterally projecting position and a forwardly folded position, said wings being transversely shaped so as to move vertically in the water when the bait is drawn forward, means for attaching a line to the front of the body, and means for attaching hooks to said body.

5. A fish bait having a body, lateral wings at opposite sides of said body arranged substantially in a plane transverse to said body at their ends adjacent thereto and having inclined outer portions, means hinging said wings to said body to swing between a laterally projecting position and a forwardly folded position, said means providing a stop for the wings in said laterally projecting position and preventing rotation of the wings with respect to the body, means for attaching a line to the front of the body, and means for attaching hooks to said body.

6. A fish bait having a body, lateral wings at opposite sides of said body arranged substantially in a plane transverse to said body at their ends adjacent thereto and having inclined outer portions, said wings being transversely slotted at said ends adjacent the body, hinging strips one for each wing extending through said slot so as to permit the wing to swing thereon and providing a stop to hold the wing in laterally projecting position, means for securing said hinging strips to the body, means for attaching a line to the front of the body, and means for attaching hooks to said body.

7. A fish bait having a body, lateral wings at opposite sides of said body arranged substantially in a plane transverse to said body at their ends adjacent thereto and having inclined outer portions, said wings being transversely slotted at said ends adjacent the body, hinging strips one for each wing extending through said slot so as to permit the wing to swing thereon, a screw for each of said hinging strips securing it to the body and forming a stop for the wing in its laterally projecting position, means for attaching a line to the front of the body, and means for attaching hooks to said body.

8. A fish bait having a buoyant body, lateral wings at opposite sides of said body, non-rotatable with respect thereto and adapted to swing backward and forward, a hook secured to the underpart of the body back of the connection of said wings to said body, and a resilient guard disposed longitudinally of the body at its lower part secured at its forward end to said body and having its rear end loosely and slidably engaging the shank of the hook.

9. A fish bait having a buoyant body, lateral wings on opposite sides of said body non-rotatable with respect thereto and each of dished cross section in the region remote from the body and presenting the dished face forwardly with its upper edge forward of the lower edge, each wing being as a whole shaped so as to tend to move upwardly out of the water and alternate with the other wing in presenting a preponderance of surface resistance to the water to cause the bait to roll when it is drawn forward, means for attaching a line to the front of the body, and means for attaching hooks to the body.

10. A fish bait having an elongated body, lateral wings on opposite sides of said body non-rotatable with respect thereto and each of dished cross section in the region remote from the body and presenting the dished face forwardly with its upper edge forward of the lower edge, the tip portions of the wings dipping into the water more deeply than the inner portions thereof and being as a whole shaped so as to tend to move upwardly out of the water and alternate in presenting a preponderance of surface resistance thereto to cause the bait to roll when it is drawn forward, means for attaching a line to the front of the body, and means for attaching hooks to the body.

11. A fish bait having an elongated body transversely rounded so as to roll in the water, lateral wings on opposite sides of said body non-rotatable with respect thereto and each of dished cross section in the region remote from the body and presenting the dished face forwardly with its upper edge forward of the lower edge, the wings standing in forwardly divergent relation to the body and being as a whole shaped so as to tend to move upwardly out of the water and alternate in presenting a preponderance of surface resistance thereto to cause the bait to roll when it is drawn forward, means for attaching a line to the front of the body, and means for attaching hooks to the body.

12. A fish bait having a buoyant body transversely rounded so as to roll in the water, lateral wings on opposite sides of said body non-rotatable with respect thereto and each of dished cross section in the region remote from the body and presenting the dished face forwardly with the upper edge forward of its lower edge, the tip portions of the wings dipping into the water more deeply than the inner portions thereof, the wings standing in forwardly divergent relation to the body and being as a whole shaped so as to tend to move upwardly out of the water and alternate in presenting a preponderance of surface resistance thereto to cause the bait to roll when it is drawn forward, means for attaching a line to the front of the body, and means for attaching hooks to the body.

13. A fish bait having a buoyant body, lateral wings on opposite sides of said body near the forward end thereof and non-rotatable with respect thereto, the forward face of each wing being dished and extending downwardly and rearwardly with its forward edge uppermost, at least one hook on said body, and means for attaching a line to the front of the body.

14. A fish bait having a buoyant body, lateral wings on opposite sides of said body near the forward end thereof and non-rotatable with respect thereto, the forward face of each wing being dished and extending downwardly and rearwardly with its forward edge uppermost, and said wings being disposed in forwardly divergent relation to the body and alternately presenting a preponderance of surface resistance to water to cause the bait to roll and to move upwardly out of the water when the bait is drawn forward on the water, at least one hook on said body, and means for attaching a line to the front of the body.

15. A fish bait comprising a body rounded to roll in water about its longitudinal axis, and wings extending laterally from opposite sides of the body near the forward end thereof and having concavo-convex outer end portions with their concave faces facing forwardly and extending downwardly and rearwardly at an angle oblique to said longitudinal axis and their upper edges forward of the lower edges, said wings when the bait is drawn forward on water being disposed along a major axis that is transverse of said longitudinal axis and said wings alternately presenting a preponderance of surface resistance to the water so as to cause the bait to roll and alternately rise and fall in the water, at least one hook on said body, and means for attaching a line to the forward end of said body.

LOUISE M. DONALY.
HELEN M. DONALY.
*Assignees of James L. Donaly, Deceased.*